United States Patent
Sattmann et al.

(10) Patent No.: US 9,085,481 B2
(45) Date of Patent: Jul. 21, 2015

(54) METHOD AND TUBULAR SEMIFINISHED PRODUCT FOR PRODUCING AN OPTICAL FIBER

(75) Inventors: Ralph Sattmann, Aschaffenburg (DE); Jan Vydra, Hanau (DE); Michael Huenermann, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 31 days.

(21) Appl. No.: 13/583,605

(22) PCT Filed: Mar. 10, 2011

(86) PCT No.: PCT/EP2011/053590
§ 371 (c)(1),
(2), (4) Date: Sep. 10, 2012

(87) PCT Pub. No.: WO2011/110617
PCT Pub. Date: Sep. 15, 2011

(65) Prior Publication Data
US 2012/0324960 A1   Dec. 27, 2012

(30) Foreign Application Priority Data

Mar. 10, 2010  (DE) .................... 10 2010 010 968

(51) Int. Cl.
| | |
|---|---|
| C03B 23/047 | (2006.01) |
| C03B 37/012 | (2006.01) |
| C03B 37/027 | (2006.01) |
| C03C 13/04 | (2006.01) |
| G02B 6/036 | (2006.01) |

(52) U.S. Cl.
CPC ..... *C03B 37/01242* (2013.01); *C03B 37/01211* (2013.01); *C03B 37/01228* (2013.01); *C03B 37/027* (2013.01); *C03B 37/02754* (2013.01); *C03C 13/045* (2013.01); *C03B 2201/075* (2013.01); *C03B 2201/12* (2013.01); *C03B 2201/30* (2013.01); *C03B 2201/31* (2013.01); *C03B 2203/22* (2013.01); *C03B 2203/23* (2013.01); *C03B 2205/30* (2013.01); *C03C 2201/12* (2013.01); *G02B 6/0365* (2013.01); *G02B 6/03633* (2013.01); *Y10T 428/2935* (2015.01)

(58) Field of Classification Search
CPC .............. C03B 23/0006; C03B 23/047; C03B 2203/22; C03B 2205/14
USPC ........................................................ 65/397
See application file for complete search history.

(56) References Cited

U.S. PATENT DOCUMENTS

| | | | |
|---|---|---|---|
| 3,981,707 A | 9/1976 | Araujo et al. | |
| 6,223,563 B1 | 5/2001 | Bahr, Jr. et al. | |
| 6,263,706 B1 | 7/2001 | Deliso et al. | |
| 7,641,969 B2 | 1/2010 | Fletcher | |
| 2002/0073740 A1* | 6/2002 | Dawes et al. | 65/397 |
| 2006/0216527 A1 | 9/2006 | Fletcher | |
| 2011/0100062 A1* | 5/2011 | Vydra et al. | 65/391 |

FOREIGN PATENT DOCUMENTS

| | | |
|---|---|---|
| DE | 10155134 C1 | 12/2002 |
| DE | 60004778 T2 | 7/2004 |
| DE | 102008047736 B3 | 1/2010 |
| EP | 1712934 A1 | 10/2006 |
| JP | 61262708 A | 11/1986 |
| JP | 9048629 A | 2/1997 |
| JP | 2001253726 A | 9/2001 |
| WO | WO 2008087132 A1 * | 7/2008 |
| WO | 2010003856 A1 | 1/2010 |

OTHER PUBLICATIONS

Heraeus, "Highly Fluorine Doped Tubes", http://http://specialty-fiber.heraeus-quarzglas.com/en/products/highlyfluorinedopedtubes/Tubes_3777.aspx, Published Apr. 29, 2009.*
English Language Espacenet Abstract of DE10155134(C1), Dec. 19, 2002.
English Language Espacenet Abstract of JP9048629(A), Feb. 18, 1997.
English Language Espacenet Abstract of JP61262708(A), Nov. 20, 1986.
English Language Espacenet Abstract of JP2001253726(A), Sep. 18, 2001.

* cited by examiner

*Primary Examiner* — Matthew Daniels
*Assistant Examiner* — Cynthia Szewczyk
(74) *Attorney, Agent, or Firm* — Tiajoloff and Kelly LLP

(57) ABSTRACT

Methods for producing an optical fiber by elongating a silica glass blank or a coaxial group of silica glass components, on the basis of which a fiber is obtained that comprises a core zone, an inner jacket zone enclosing the core zone and a ring zone surrounding the inner jacket zone, are known. In order to provide, proceeding from this, a method, a tubular semifinished product and a group of coaxial components for the cost-effective production of an optical fiber, which is characterized by a high quality of the boundary between the core and jacket and by low bending sensitivity, according to the invention, the silica glass of the ring zone is provided in the form of a ring zone tube made of silica glass having a mean fluorine content of at least 6000 weight ppm and the tube has an inner tube surface and an outer tube surface, wherein via the wall of the ring zone tube, a radial fluorine concentration profile is adjusted which has an inner fluorine depletion layer with a layer thickness of at least 1 μm and no more than 10 μm, in which the fluorine content decreases toward the inner tube surface and is no more than 3000 weight ppm in a region close to the surface which has a thickness of 1 μm.

21 Claims, 1 Drawing Sheet

METHOD AND TUBULAR SEMIFINISHED PRODUCT FOR PRODUCING AN OPTICAL FIBER

Figure 1:
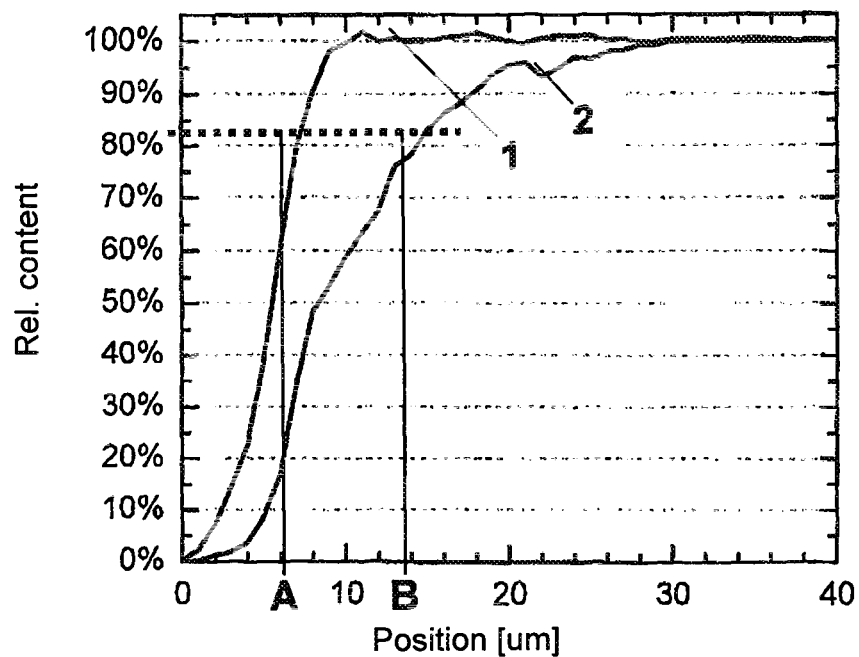

The present invention refers to a method for producing an optical fiber by elongating a quartz glass preform or a coaxial assembly of quartz glass components, the fiber comprising a core zone with a refractive index $n_K$, an inner cladding zone overcladding the core zone and having a refractive index $n_{Mi}$, a ring zone surrounding the inner cladding zone and consisting of doped quartz glass having a refractive index $n_F$, as well as an outer cladding zone surrounding the ring zone, where: $n_F < n_{Mi} < n_K$.

Furthermore, the present invention refers to a tubular semifinished product for producing an optical fiber.

PRIOR ART

The attenuation of the light signal guided in an optical fiber depends inter alia on bends of the fiber. Small bending radii effect an increased optical attenuation. The signal loss can be reduced by using bending-insensitive optical fibers. Such fibers have been known for many years and more and more attention is paid to them in the laying of fiber optic networks up to the home (fiber-to-the-home; FTTH). With this application, particularly small bending radii are often desired on account of spatial restrictions or esthetic demands.

Such a bending-insensitive optical fiber is described in WO 2010/003856 A1, which also discloses a manufacturing method for the fiber according to the above-mentioned type. The bending-insensitive optical fiber comprises a core zone with a refractive index $n_K$, a cladding zone overcladding the core zone and having a refractive index $n_{Mi}$, a ring zone surrounding the cladding zone and consisting of fluorine-doped quartz glass having a refractive index $n_F$, as well as an outer layer surrounding the ring zone and consisting of undoped quartz glass with a refractive index $n_{Ma}$, resulting in a radial refractive index profile, where: $n_{Ma} > n_F < n_K$. The fiber is obtained by elongating a quartz glass preform or a coaxial assembly of quartz glass components, wherein the quartz glass of the ring zone is produced in a plasma outside deposition process in that on a tubular or rod-shaped substrate body a ring zone layer is produced from the fluorine-doped quartz glass having a layer thickness of at least 1 mm and a refractive index $n_F \leq 1.4519$.

To achieve an efficient production method and to minimize the risk of waste, it is advantageous when the individual components of the fiber are produced in separate method steps and are only joined in a final step.

Such a method is described in EP 1 712 934 A1, which also discloses a semifinished product according to the aforementioned type. For the manufacture of a large-volume preform a semifinished product is provided that is exclusively composed of a number of tube- or rod-shaped individual elements. The individual elements constitute a core rod which has been formed by joining end-to-end stacked segments and which is arranged inside an inner overclad tube. The inner overclad tube is surrounded by an outer overclad tube. The components are arranged to be coaxial with one another and are directly drawn into the optical fiber in an elongating process.

Hydroxyl groups and metallic impurities, such as chlorine, aluminum or iron, may negatively affect the optical transmission of the fiber to be drawn. To minimize their impact, the inner overclad tube shows an expensive quartz-glass quality of high purity. On the other hand, in order to keep the costs of the semifinished product altogether low, it is suggested that the outer overclad tube should have a higher concentration of impurities.

It is true that the separate production of the individual elements and their final joining in the fiber drawing process are conducive to the low-cost production of optical fibers and reduce the risk of waste. However, this automatically results in additional surfaces and interfaces between the individual elements to be joined, which augments interfacial problems and increases the demands made on the quality of the interfaces. Special attention is here paid to the formation of bubbles in the interfacial area.

DE 10 2008 047 736 B3 describes the use of a fluorine-doped quartz glass tube for overcladding a core rod.

U.S. Pat. No. 6,263,706 B1 discloses a method for setting a fluorine-concentration profile in a $SiO_2$ soot tube. The soot tube is preferably fluorine-doped through the gas phase after removal of a mandrel in that a fluorine-containing doping gas is passed along the outer wall of the soot tube and either no gas or helium is passed through the inner bore The refractive index profiles produced are substantially parabolic with a maximum in the tube center.

DE 600 04 778 T2 describes the manufacture of fluorine-doped quartz glass bodies through a sol-gel-route. Fluorine doping is carried out by adding a fluorine-containing start substance to the sol, preferably tetramethylammonium fluoride. After sintering the cylindrical quartz glass samples show refractive index curves in the case of which the refractive index is decreasing from the outside to the inside (and the fluorine concentration is thus increasing from the outside to the inside). The highest fluorine concentration is obtained in the center. The decrease of the fluorine concentration at the edge is ascribed to fluorine loss caused by heating.

U.S. Pat. No. 3,981,707 A describes the manufacture of an optical fiber by collapsing a fluorine-doped quartz glass tube which has an inhomogeneous radial fluorine concentration profile in the case of which the fluorine concentration has a maximum in the tube center and is decreasing towards the inner tube wall and towards the outer tube wall. The fluorine depletion in the area of the free tube surfaces is produced in that the tube consisting of fluorine-doped quartz glass is treated at a high temperature.

DE 101 55 134 C1 discloses a method for producing a preform in that a core rod is provided at a predetermined cladding/core ratio with a soot layer by means of a POD (plasma outside deposition) process in a hydrogen-free atmosphere, and the soot layer is subsequently dried and vitrified. A hydroxyl croup content of less than 30 wt. ppb and a defect-free contact area to the core rod are obtained in the cladding glass.

TECHNICAL OBJECT

It is the object of the present invention to provide a method and a tubular semifinished product for the low-cost production of an optical fiber that is distinguished by a high quality of the interface between core and cladding and by low bending sensitivity.

GENERAL DESCRIPTION OF THE INVENTION

As for the production method, this object starting from the above-mentioned method is achieved according to the invention in that the quartz glass of the ring zone is provided in the form of a ring zone tube consisting of quartz glass with a mean fluorine content of at least 6000 wt. ppm, which has a wall defined by an inner tube surface and an outer tube surface, a radial fluorine concentration profile being set over the ring zone tube wall, said profile having an inner fluorine depletion layer with a layer thickness of at least 1 μm and not more than 10 μm, in which the fluorine content decreases towards the inner tube surface and is not more than 3000 wt. ppm in a near-surface region with a thickness of 1 μm.

According to the invention the quartz glass for the ring zone is provided in the form of at least one fluorine-doped quartz glass tube, which is here called "ring zone tube".

A fluorine-doped quartz glass tube is produced either with the help of a so-called POD (plasma outside deposition) process in that $SiO_2$ particles are directly vitrified into a quartz glass tube by direct fluorine doping, or with the help of a CVD method by hydrolysis or pyrolysis of silicon-containing start compounds with buildup of a $SiO_2$ soot body which is subsequently doped with fluorine and sintered.

The other individual elements, namely an outer cladding tube of doped or undoped quartz glass for producing the outer cladding zone of the fiber and the core rod for producing the core zone and the inner cladding zone of the fiber, can also be produced in separate processes and can subsequently be arranged in the form of an assembly of coaxial components for producing the fiber. The coaxial assembly is subsequently collapsed into a preform or is elongated or is directly elongated into a fiber. If a preform is first produced, said preform is drawn in a separate method step into the optical fiber. In this process or before that process it may be provided with additional cladding material. e.g. by adding further quartz glass in tubular form or by outside deposition methods.

In a monomode fiber, the ring zone of fluorine-doped quartz glass with a lower refractive index than the cladding glass effects an additional conduction of the light mode. In order to prevent an excessive change in the mode field diameter as compared with a standard monomode fiber, the ring zone has a slight distance from the core, i.e., it is separated from said core by an inner cladding glass zone. Thus the ring zone effects a reduction of the losses during fiber bending in comparison with a standard fiber without ring zone, without impairing the compatibility with standard monomode fibers. This is important when bending-insensitive fibers with ring zone are connected to standard fibers.

It is important that, when a contact area is formed towards the core zone, the fluorine-doped ring zone tube is provided over its wall with a radial fluorine concentration profile decreasing towards the inner tube surface. It has been found that this substantially reduces the formation of bubbles on the interface with the core rod in the elongation process. The area of reduced fluorine concentration in the edge portion of the ring zone tube is hereinafter also called "fluorine depletion layer".

Doping with fluorine effects a reduction of the refractive index of the quartz glass of the ring zone. With respect to a high bending insensitivity of the optical fibers a high fluorine concentration and a steeper refractive-index jump between core rod and ring zone are advantageous. The fluorine content is therefore set to at least 6000 wt. ppm and it can amount to up to 15,000 wt. ppm. The refractive index decrease accomplished by fluorine doping as compared to undoped quartz glass is at least $2\times10^{-4}$ in comparison with the refractive index of undoped quartz glass.

On the other hand, however, the problem regarding bubbles on the interfaces is increasing within an increasing mean fluorine content of the ring zone tube. Hence, the bubble-reducing effect of the fluorine depletion layer is particularly noticeable in the case of high average fluorine contents. The method according to the invention is thus preferably noticeable in ring zone tubes having high average fluorine contents of 6000 wt. ppm or more. The fluorine concentration that follows from a spectroscopic measurement across the tube wall is understood as the average fluorine content of the ring zone tube. The fluorine depletion layer is here not significantly noticeable because of its comparatively small thickness.

Doping with fluorine effects a reduction of the refractive index of the quartz glass of the ring zone. As has been mentioned above, a steeper refractive-index jump between core rod and ring zone is advantageous for a high bending insensitivity of the optical fiber. Fluorine concentration gradients and thus radial refractive gradients are in this respect undesired per se. Surprisingly, however, it has been found that layer thicknesses of less than 10 μm are acceptable and represent a suitable compromise between bending insensitivity of the fiber and quality of the interface. At a layer thickness of less than 1 μm, however, there is no significant effect as regards a reduced bubble formation.

The smaller the fluorine content in the fluorine depletion layer, the smaller is the problem regarding the formation of bubbles on the contact areas to the ring zone tube. In this respect the fluorine depletion layer in a near-surface region with a thickness of 1 μm has a fluorine content of 3000 wt. ppm or less. The particularly low fluorine content in the near-surface region substantially contributes to a low bubble formation.

The fluorine depletion layer is defined as that layer thickness that has a fluorine concentration which has less than 80% of the maximum concentration of fluorine in the quartz glass of the ring zone tube. Likewise, the fluorine-depleted near-surface region is defined as that layer thickness that has a fluorine concentration that is less than 80% of the maximum concentration of fluorine in the quartz glass of the ring zone tube.

What is decisive is the decline of the fluorine concentration profile towards the core rod. However, it has been found to be advantageous when the ring zone tube is provided with a radial fluorine concentration profile over the ring zone tube wall that also comprises an outer fluorine depletion layer in which the fluorine concentration decreases towards the outer tube surface.

This results in reduced bubble formation also on the interface between ring zone and outer cladding zone. Less strict demands are made on the dimension of the outer fluorine depletion layer, on the steepness of the decrease in the fluorine concentration and on the maximum concentration in the near-surface region than in the case of the inner fluorine depletion layer. The dimensions, profiles and concentrations which have already been explained further above for the inner fluorine depletion layer are at any rate adequate for the outer fluorine depletion layer.

It has turned out to be advantageous when the fluorine depletion layer has a layer thickness of less than 4 μm.

Layer thicknesses of less than 4 μm constitute a particularly suitable compromise between bending insensitivity of the fibers and quality of their inner interfaces to the ring zone tube.

The ring zone tube is preferably produced without tools by drawing a base tube from a fluorine-doped quartz glass while forming fluorine depletion zones on the inner tube surface and on the outer tube surface.

The heating of the base tube and the accompanying out-diffusion of fluorine from the near-surface layers normally lead however to a fluorine depletion on the inner surface and on the outer surface, resulting in a flat concentration gradient. The fluorine out-diffusion can be set by selecting the temperature and the heating duration during elongation of the base tube such that a fluorine-depleted layer is obtained with the above-mentioned dimensions and concentration profiles. Suitable parameter pairs of temperature/heating duration can be determined by the skilled person in a few tests.

Further indications are the outer diameter of the drawn ring zone tube, which is preferably in the range of 10-50% of the outer diameter of the base tube; typically, one obtains outer diameters in the range of 30-70 mm, and the cylinder ratio of outer diameter to inner diameter is in the ring zone tube 0.2 to 0.8 smaller than in the base tube.

As an alternative, the ring zone tube is heated after its production in a separate method step for producing the fluorine depletion layer with the desired thickness and the predetermined fluorine concentration profile. Also when the ring zone tube is heated, the fluorine out-diffusion can be set by selecting the temperature and the heating duration in a few tests.

Heating the base tube in the drawing process or heating the ring zone tube is carried out preferably by means of an electric heater in a hydrogen-free atmosphere.

This reduces the input of hydroxyl groups into near-surface regions of the ring zone tube.

Without any special precautions, a fluorine-depleted surface layer with a thickness exceeding the target size may be obtained after the drawing of the base tube. This result can also be achieved during heating of the ring zone tube for the purpose of setting a sufficiently thick fluorine depletion layer—also on purpose. The excessive fluorine-depleted layer thickness can be removed by etching with hydrofluoric acid or a gaseous etchant. In this connection it has therefore turned out to be useful to partly remove at least the inner tube surface of the ring zone tube after drawing of the base tube or during drawing.

Owing to the removal of the inner surface the thickness of the fluorine depletion layer is reduced to the predetermined desired value and a clean surface that is as defect-free as possible is produced at the same time. The removing process is preferably carried out by way of gas-phase etching to avoid a loading of the quartz glass with water and hydroxyl groups.

The thickness of the fluorine-depleted surface layer may amount to 15 μm or more after drawing of the base tube or after heating of the ring zone tube. It is important that in the subsequent removal of the inner surface the removal depth is smaller than said previously produced, fluorine-depleted surface layer, so that a part thereof is maintained as the fluorine depletion layer with the desired target thickness. In this respect it has turned out to be advantageous when the removal depth of the inner surface is in the range of 10-70% of the original thickness of a fluorine-depleted surface layer.

The smaller the fluorine content in the fluorine depletion layer, the smaller is the problem regarding the formation of bubbles on the contact areas to the ring zone tube. In this respect it has turned out to be advantageous when the fluorine depletion layer in said near-surface region has a fluorine content of not more than 2000 wt. ppm. A low fluorine content in the near-surface layer with a layer thickness of 1 μm substantially reduces the formation of bubbles.

It has been found that the hydroxyl group content in combination with a high fluorine content can promote bubbles in the region of the contact areas to the ring zone tube. A procedure is therefore preferred in which the quartz glass of the ring zone tube in the area of the fluorine depletion layer has a mean hydroxyl-group content of less than 1 wt. ppm and preferably of less than 0.5 wt. ppm.

A small hydroxyl group content in the fluorine depletion layer is e.g. achieved when the heating process during elongation of a base tube for obtaining the ring zone tube or the heating of the ring zone tube for forming the fluorine depletion layer is carried out in an electric heating zone in a hydrogen-free atmosphere.

A low hydroxyl group content is equally helpful for the other individual elements to be joined with the ring zone tube to avoid bubble formation. In this connection it has turned out to be advantageous when the quartz glass of the inner cladding zone is provided by a core rod that in the area of a surface layer with a layer thickness of 10 μm has a hydroxyl group content of less than 0.5 wt. ppm.

This low hydroxyl group content in the near-surface area of the core rod is e.g. achieved in that the core rod is elongated in an electric heating zone, i.e., no hydrogen-containing flame is used for flame polishing, or the like.

It is also advantageous for the same reason when the quartz glass of the outer cladding zone is provided by an outer cladding tube that in the area of its inner surface has a surface layer that in a layer thickness of 10 μm has a hydroxyl group content of less than 0.5 wt. ppm.

The outer cladding tube consists of doped or undoped quartz glass and is preferably produced by an OVD soot-buildup process and by subsequent dehydration in chlorine-containing atmosphere and by sintering, including a mechanical treatment and drawing into a cladding tube.

The low hydroxyl group content in the area of the inner surface of the outer cladding tube is also realized in that the inner surface of the outer cladding tube is produced by mechanical treatment.

Due to the mechanical treatment, a possibly increased hydroxyl group content in the surface area can be removed without the introduction of new hydroxyl groups.

The heating of the ring zone tube for producing the fluorine depletion layer can also be carried out during elongation of the assembly consisting of carbon, ring zone tube and possible further individual parts. The length of the heating zone and the feed rate of the assembly through the heating zone should be paid attention to. In this respect it has turned out to be advantageous when the quotient of heating zone length (in mm) and feed rate of the base tube (in mm/min) is 10 min or more.

The length of the heating zone is at least 150 mm and is typically in the range of 180 mm to 250 mm. The temperature in the range of the surface of the ring zone tube is at least 2200° C.

As for the tubular semifinished product for producing an optical fiber, the above-mentioned object is achieved according to the invention in that it consists of quartz glass having a mean fluorine content of at least 6000 wt. ppm, and has a wall defined by an inner tube surface and an outer tube surface, over which a radial fluorine concentration profile is set that has an inner fluorine depletion layer with a layer thickness of at least 1 μm and not more than 10 μm, in which the fluorine content decreases towards the inner tube surface and is not more than 3000 wt. ppm in a near-surface region with a thickness of 1 μm.

The semifinished product in the form of a fluorine-doped quartz glass tube is here designated as a "ring zone tube". Said tube is produced either with the help of a so-called POD (plasma outside deposition) method in which $SiO_2$ particles are directly vitrified into a quartz glass tube synthetically by direct fluorine doping, or with the help of a CVD method by hydrolysis or pyrolysis of silicon-containing start compounds with buildup of a $SiO_2$ soot body that is subsequently doped with fluorine and is sintered.

The ring zone tube serves to produce an optical fiber by means of the above-described method and is here processed in a coaxial assembly together with other individual elements, including an outer cladding tube and a core rod, into a preform or into a fiber. The inner tube surface and the outer tube surface are softened and fused with quartz glass of other individual elements consisting of quartz glass. Due to the fluorine content of the ring zone tube, bubbles may form on the contact areas.

To counteract this effect, the ring zone tube according to the invention is provided over its wall with a radial fluorine concentration profile which decreases at least towards the inner surface. As a result, the formation of bubbles on the interface to the core rod is substantially reduced during elongation of the semifinished product. The portion of reduced fluorine concentration in the edge portion of the ring zone tube is called "fluorine depletion layer".

Doping with fluorine effects a reduction of the refractive index of the quartz glass of the ring zone. With respect to a high bending insensitivity of the optical fibers a high fluorine concentration and a steep refractive-index jump between core rod and ring zone are advantageous. The fluorine content of the ring zone tube is therefore at least 6000 wt. and it can amount to up to 15,000 wt. ppm. The refractive index reduction caused by fluorine doping as compared with undoped quartz glass is at least $2 \times 10^{-4}$ in comparison with the refractive index of undoped quartz glass.

On the other hand, however, the problem regarding bubbles on the interfaces is increasing within an increasing mean fluorine content of the ring zone tube.

Hence, the bubble-reducing effect of the fluorine depletion layer is particularly noticeable in the case of high mean fluorine contents. The method according to the invention is thus preferably noticeable in ring zone tubes having high mean fluorine contents of 6000 wt. ppm or more.

Doping with fluorine effects a reduction of the refractive index of the quartz glass of the ring zone. As has been mentioned above, a steeper refractive-index jump between core rod and ring zone is advantageous for a high bending insensitivity of the optical fiber. Fluorine concentration gradients and thus radial refractive gradients are in this respect undesired per se. Layer thicknesses of less than 10 µm are however acceptable and represent a suitable compromise between bending insensitivity of the fiber and quality of the interface. At a layer thickness of less than 1 µm, however, there is no significant effect as regards reduced bubble formation.

The smaller the fluorine content in the fluorine depletion layer, the smaller is the problem regarding the formation of bubbles on the contact surfaces to the ring zone tube. In this respect the fluorine depletion layer in a near-surface region with a thickness of 1 µm has a fluorine content of 3000 wt ppm or less. The particularly low fluorine content in the near-surface region substantially contributes to a low bubble formation.

The fluorine depletion layer and the fluorine-depleted near-surface region have been defined further above with reference to the method according to the invention.

Advantageous developments of the semifinished product according to the invention follow from the sub-claims. Insofar as configurations of the semifinished product indicated in sub-claims copy the procedures indicated in sub-claims with respect to the method according to the invention, reference is made for supplementary explanation to the above statements on the corresponding method claims.

The ring zone tube serves to produce an optical fiber. To this end it is arranged together with other individual elements, including an outer cladding tube of doped or undoped quartz glass and a core rod, which are each produced in separate processes, in the form of the component assembly. This assembly is subsequently processed into a preform or directly into a fiber. It is essential that the fluorine-doped ring zone tube is provided across its wall with a radial fluorine concentration profile that is decreasing to the inner surface. As a result, the formation of bubbles on the interface to the core rod is considerably reduced during elongation of the semifinished product.

The ring zone tube brings about an increased bending insensitivity in the optical fiber drawn therefrom.

The core rod is preferably composed of a plurality of core rod segments which are arranged end to end in axial direction within the ring zone tube. The segmentation of the core rod permits core rod lengths of any desired dimensions.

An annular gap with a gap width in the range of preferably 0.5 to 2 mm remains in the assembly between the core rod and the ring zone tube. The same is true for the ring gap between the ring zone tube and the outer cladding tube.

The ratio of outer diameter to inner diameter of the ring zone tube is preferably within the range between 1.4 and 1.8, at a preferred wall thickness between 2 and 12 mm. The length of the ring zone tube is typically between 1 and 3 m, wherein a plurality of ring zone tube sections can be welded end to end to one another.

EMBODIMENT

Figure 2:
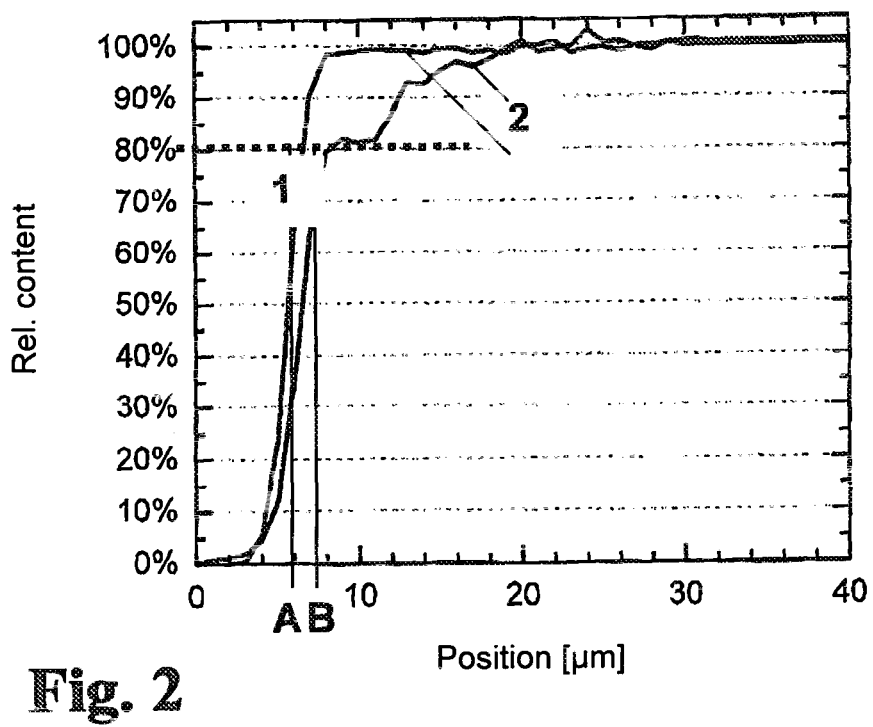

The invention will now be explained in more detail with reference to embodiments and a patent drawing, which drawing shows in detail in:

FIG. 1 a diagram with radial concentration profiles of $SiO_2$ and fluorine in the area of the outer tube surface of a ring zone tube, and FIG. 2 a diagram with radial concentration profiles of $SiO_2$ and fluorine in the area of the inner tube surface of a ring zone tube.

A soot body is produced with the help of a standard soot deposition method and is subsequently doped with fluorine.

After vitrification of the soot body a quartz glass cylinder is obtained with an outer diameter of 200 mm, an inner diameter of 80 mm, resulting in a ratio of outer diameter to inner diameter of 2.5. The quartz glass has a mean hydroxyl group content of 0.1 wt. ppm and a mean fluorine content of 6100 wt. ppm, which yields a refractive index decrease as compared with undoped quartz glass.

The start cylinder is drawn without tools into a ring zone tube having an outer diameter of 38 mm, an inner diameter of 25 mm, and a wall thickness of 6.5 mm.

The start cylinder is here fed in a hydrogen-free nitrogen atmosphere to an electric heating zone at a temperature of at least 2200° and at a length "L" of 170 mm at a feed rate "v" of 10 mm/min, resulting in a value of 10 min for the quotient L/v.

The ring zone tube obtained thereafter is distinguished by an inner tube surface which is smoothed by hot forming and has a particularly high surface quality. A fluorine-depleted surface layer with a thickness of about 5 µm is formed by heating during the elongation process in the area of the inner and outer tube surfaces of the ring zone tube.

The corresponding concentration profile in the area of the outer surface is shown in FIG. 1. The concentrations for fluorine (curve 2) and $SiO_2$ (curve 1) are plotted on the ordinate in relative units (based on the respective maximum concentration of $SiO_2$ and fluorine), and the radial position is plotted in [µm] on the abscissa. The gradual rise in the respective concentration profiles and the offset from the zero point is due to the spatial resolution of the measuring method.

The layer thickness that has a fluorine concentration of less than 80% of the maximum value is defined as the "fluorine depletion layer". The associated position is designated with "B" in FIG. 1. The concentration of SiO$_2$ represents the reference point (zero point) for the position value. The zero point for the position, which zero point pertains to the 80% concentration value, is designated with "A" in FIG. 1. The layer thickness for the fluorine depletion layer thus follows from the distance A-B of the concentration profiles of fluorine and SiO$_2$ at the 80% concentration value. In the near-surface region of up to 1 μm the fluorine concentration is less than 2100 wt. ppm and the thickness of the fluorine-depleted surface layer is in this case about 7 μm on the whole. It is acceptable for the outer cylinder jacket of the ring zone tube, but not optimal for the inner cylinder jacket.

Therefore, the inner surface of the ring zone tube, which after elongation has a similar fluorine depletion layer as the outer cladding, is etched off in that a hot gas stream of etching gas (SF$_6$) is passed through the inner bore. The concentration profiles obtained thereafter on the inner wall are shown in FIG. 2. It follows from the comparison of the concentration profiles of SiO$_2$ (curve 2) and fluorine (curve) that due to the removal of the inner surface the thickness of the fluorine depletion layer is adjusted to the predetermined desired value of about 1.5 μm and a steeper concentration curve is simultaneously obtained in the near-surface region. Due to the etching process a clean and defect-free surface is produced. In this case, too, the layer thickness which has a fluorine concentration which is less than 80% of the maximum concentration of fluorine and which can be read by way of the positional distance A-B is defined as the fluorine depletion layer. The mean fluorine content within the fluorine depletion layer is more than 3000 wt. ppm and it is about 2800 wt. ppm within an inner near-surface region of 1 μm.

It is true that the mean chlorine content of the ring zone tube is 200 wt. ppm and the nominal hydroxyl group content of the quartz glass of the ring zone tube is 0.1 wt. ppm. Due to the elongation process, it is however increased near the surface to maximum values of 5 wt. ppm or more. Due to the subsequent gas-phase etching a layer with a relatively high hydroxyl group content is however removed, so that a mean hydroxyl group of not more than 0.4 wt. ppm is obtained on the surface of the fluorine depletion layer, measured over a layer thickness of 1 μm.

The ring zone tube obtained thereby is used for overcladding a core rod in a rod-in-tube method. To this end segments are cut to the desired lengths from the ring zone tube. The core rod has a GeO$_2$ doped core region with a radius of 12 mm and is surrounded with an inner cladding of undoped quartz glass having a layer thickness of 5.5 mm.

The core rod is inserted into the inner bore of the ring zone tube and the tube, in turn, is surrounded by a jacket tube of undoped quartz glass with the refractive index $n_{Ma}$ that has an outer diameter of 175 mm, an inner diameter of 40 mm, and a mean chlorine content of 1800 wt. ppm.

This coaxial arrangement of components is subsequently introduced into a drawing furnace in vertical orientation and is softened therein zone by zone, starting with the lower end, and a fiber is drawn from the softened region. The outer and inner "fluorine depletion layers" of the ring zone tube serve as "passivation layers" that reduce the out-diffusion of fluorine and thereby prevent the formation of bubbles in the area of the interfaces. The fluorine depletion layers thereby contribute to a low-defect contact area and interface to the core rod and to the jacket tube.

A bending-insensitive optical single-mode fiber with an outer diameter of 125 μm is drawn; it is distinguished by a ring zone with a high fluorine concentration and is has a distance from the outer region of the core zone. The following is true for the radial course of the refractive index of the assembly: $n_{Ma} > n_F < n_{Mi} < n_K$.

The invention claimed is:

1. A method for producing an optical fiber, said method comprising:
   providing a quartz glass preform or a coaxial assembly of quartz glass components; and
   elongating said preform or coaxial assembly so as to form the optical fiber;
   the fiber comprising
     a core zone with a refractive index $n_K$,
     an inner cladding zone overcladding the core zone and having a refractive index $n_{Mi}$,
     a ring zone surrounding the inner cladding zone and consisting of doped quartz glass having a refractive index $n_F$, and
     an outer cladding zone surrounding the ring zone, where: $n_F < n_{Mi} < n_k$; and
   wherein the preform or coaxial assembly includes the quartz glass of the ring zone in the form of a ring zone tube consisting of quartz glass with a mean fluorine content of at least 6000 wt. ppm,
   said ring zone tube having a wall defined by an inner tube surface and an outer tube surface,
   the ring zone tube wall having a radial fluorine concentration profile over a radial thickness of the ring zone tube wall,
   said profile having an inner fluorine depletion layer with a layer thickness of at least 1 μm and not more than 10 μm,
   the inner fluorine depletion layer having a near-surface region with a thickness of 1 μm near the inner tube surface, and
   the inner fluorine depletion layer having a fluorine content that decreases towards the inner tube surface and is not more than 3000 wt, ppm in said near-surface region.

2. The method according to claim 1, wherein the radial fluorine concentration profile has an outer fluorine depletion layer with a fluorine concentration that decreases towards the outer tube surface.

3. The method according to claim 1, wherein the inner fluorine depletion layer has a layer thickness of at least 1 μm and less than 4 μm.

4. The method according to claim 3, wherein at least the inner tube surface of the ring zone tube is partly removed after drawing or during drawing of a base tube, and the removal depth of the inner tube surface is in a range of 10% to 70% of an original thickness of a fluorine-depleted surface layer.

5. The method according to claim 1, wherein the ring zone tube is produced without tools by drawing a base tube from a fluorine-doped quartz glass while forming fluorine depletion zones on the inner surface and on the outer surface.

6. The method according to claim 1, wherein the fluorine content in the near-surface layer is not more than 2000 wt. ppm.

7. The method according to claim 1, wherein the quartz glass of the ring zone tube in the area of the inner fluorine depletion layer has a mean hydroxyl-group content of less than 1 wt. ppm.

8. The method according to claim 1, wherein the quartz glass of the inner cladding zone is provided by a core rod that has an outer surface layer with a layer thickness of 10 μm, wherein said outer surface layer is of quartz glass that has a hydroxyl group content of less than 0.5 wt. ppm.

9. The method according to claim 1, wherein the quartz glass of the ring zone tube in the area of the inner fluorine depletion layer has a mean hydroxyl-group content of less than 0.5 wt. ppm.

10. The method according to claim 1, wherein the inner fluorine depletion layer has a mean fluorine content across the layer thickness thereof that is greater than 3000 wt. ppm.

11. The method according to claim 1, wherein the radial thickness of the ring zone tube wall is at least 6.5 mm.

12. A method for producing an optical fiber, said method comprising:
    providing a quartz glass preform or a coaxial assembly of quartz glass components; and
    elongating said preform or coaxial assembly so as to form the optical fiber; the fiber comprising
        a core zone with a refractive index $n_K$;
        an inner cladding zone overcladding the core zone and having a refractive index $n_{Mi}$;
        a ring zone surrounding the inner cladding zone and consisting of doped quartz glass having a refractive index $n_F$; and
        an outer cladding zone surrounding the ring zone, where: $n_F < n_{Mi} < n_K$; and
    wherein the preform or coaxial assembly includes the quartz glass of the ring zone in the form of a ring zone tube;
    said ring zone tube having a wall extending between an inner tube surface and an outer tube surface and having a radial thickness of at least 2 mm, and having a fluorine concentration over the radial thickness that includes a maximum fluorine concentration at one or more points;
    said wall including an inner fluorine depletion layer with a layer thickness of at least 1 μm and not more than 10 μm;
    the inner fluorine depletion layer having a near-surface region with a thickness of 1 μm near the inner tube surface;
    the wall having a mean fluorine content over the radial thickness thereof of at least 6000 wt. ppm;
    the inner fluorine depletion layer having a fluorine content that is less than 80% of the maximum fluorine concentration over the layer thickness and that decreases towards the inner tube surface;
    the near-surface region having a fluorine content that is not more than 3000 wt. ppm.

13. The method according to claim 12, wherein the ring zone wall has an outer fluorine depletion layer with a fluorine concentration that decreases towards the outer tube surface.

14. The method according to claim 12, wherein the inner fluorine depletion layer has a layer thickness of at least 1 μm and less than 4 μm.

15. The method according to claim 14, wherein at least the inner tube surface of the ring zone tube is partly removed to a removal depth during or after drawing of a base tube, and the removal depth of the inner tube surface is in a range of 10% to 70% of an original thickness of a fluorine-depleted surface layer.

16. The method according to claim 12, wherein the ring zone tube is produced by drawing a base tube from fluorine-doped quartz glass while forming fluorine depletion zones on the inner surface and on the outer surface.

17. The method according to claim 12, wherein the fluorine content in the near-surface layer is not more than 2000 wt. ppm.

18. The method according to claim 12, wherein the quartz glass of the inner fluorine depletion layer has a mean hydroxyl-group content of less than 1 wt. ppm.

19. The method according to claim 12, wherein the quartz glass of the ring zone tube in the inner fluorine depletion layer has a mean hydroxyl-group content of less than 0.5 wt. ppm.

20. The method according to claim 12, wherein the quartz glass of the inner cladding zone is provided by a core rod that has an outer surface layer with a layer thickness of 10 μm, wherein said outer surface layer is of quartz glass that has a hydroxyl group content of less than 0.5 wt. ppm.

21. The method according to claim 12, wherein the inner fluorine depletion layer has a mean fluorine content across the layer thickness thereof that is greater than 3000 wt. ppm.

\* \* \* \* \*